United States Patent
Matsumiya et al.

(10) Patent No.: US 6,704,298 B1
(45) Date of Patent: Mar. 9, 2004

(54) REPEATER AMPLIFIER APPARATUS

(75) Inventors: Satoru Matsumiya, Tokyo (JP); Naoyuki Haraguchi, Tokyo (JP)

(73) Assignee: Kokusai Electric Co., Ltd., Tokyo (JP)

( * ) Notice: Subject to any disclaimer, the term of this patent is extended or adjusted under 35 U.S.C. 154(b) by 0 days.

(21) Appl. No.: 09/393,275

(22) Filed: Sep. 10, 1999

(30) Foreign Application Priority Data

Sep. 11, 1998 (JP) ............................................. 10-258991
Aug. 27, 1999 (JP) ............................................. 11-240810

(51) Int. Cl.⁷ .............................. H04M 3/00; H04B 7/14
(52) U.S. Cl. ............................ 370/315; 455/419; 455/7
(58) Field of Search ................................. 370/315, 529, 370/527, 816; 455/7, 11.1, 15–25, 418, 419, 420, 88; 359/145, 157, 159, 179

(56) References Cited

U.S. PATENT DOCUMENTS

| | | | |
|---|---|---|---|
| 4,817,190 A | * 3/1989 | Comroe et al. | 455/419 |
| 4,980,887 A | * 12/1990 | Dively et al. | 714/703 |
| 5,301,056 A | * 4/1994 | O'Neill | 359/145 |
| 5,689,355 A | * 11/1997 | Okubo et al. | 359/179 |
| 5,754,954 A | * 5/1998 | Cannon et al. | 455/419 |
| 5,812,933 A | * 9/1998 | Niki | 455/16 |
| 5,828,318 A | * 10/1998 | Cesar | 340/3.5 |
| 5,952,932 A | * 9/1999 | Sorensen | 340/3.5 |
| 6,005,853 A | * 12/1999 | Wang et al. | 370/332 |
| 6,018,645 A | * 1/2000 | Spatz et al. | 455/88 |
| 6,243,585 B1 | * 6/2001 | Pelech et al. | 455/449 |

* cited by examiner

*Primary Examiner*—Erika Gary
*Assistant Examiner*—Eliseo Ramos-Feliciano
(74) *Attorney, Agent, or Firm*—McGinn & Gibb, PLLC (57) ABSTRACT

A repeater amplifier apparatus is provided in which an operator is able to change an operation program of a slave station device without actually visiting to an installation site of the slave station device, thus enabling the operation program to be changed in an efficient manner. The repeater amplifier apparatus includes a master station device for communicating with a base station device, and a slave station device connected to the master station and adapted to communicate with a mobile station device. The master station device comprises a first down repeater for receiving a signal from the base station device to amplify and send it to the slave station device, a first up repeater for receiving a signal from the slave station device and amplify and send it to the base station device, and a first control unit for controlling the master station device. The slave station device comprises a second down repeater for receiving a signal from the master station device to amplify and send it to the mobile station device, a second up repeater for receiving a signal from the mobile station device and amplify and send it to the master station device, and a second control unit for controlling the slave station device. The repeater amplifier apparatus further includes a slave station operation program changing means for changing an operation program of the slave station device through the control unit of the master station device when the master and slave station devices are in normal operation.

13 Claims, 3 Drawing Sheets

REPEATER AMPLIFIER APPARATUS

BACKGROUND OF THE INVENTION

1. Field of the Invention

The present invention relates to a repeater amplifier apparatus including a master station device and one or more slave station device, and more particularly, to such an apparatus capable of rewriting an operation program of the slave station device from the master station device.

2. Description of the Related Art

In the communication of wireless terminal equipment such as portable telephones, a repeater amplifier apparatus for radio communication repeater is used for performing radio or wireless communication with a base station device even when a slave station device in the form of a terminal device is in a tunnel, a building or the like.

The repeater amplifier apparatus includes a master station device which can communicate with the base station device, and a slave station device which is connected to the master station device and which is able to communicate with a slave station device, the slave station device being set up in a space between the roof and the ceiling of a building or in the interior of a tunnel, or like other places.

The master station device and the slave station device each have a control unit for self control thereof so that they can operate to provide the best communication suitable for the environmental condition under the control of an operation program executed by each control unit.

Incidentally, an example of a change of the slave station program is to replace one specification program with another or change operation parameters thereof as required. Specifically, in the normal operating state of the slave station, at customer's request, one specification or operation mode of the system, in which the power supply to the amplifier is turned off when the output of the amplifier exceeds 30 dB due to an excessive input thereto, is changed to another specification or operation mode, in which when the output of the amplifier exceeds 30 dB, the amplifier output is first reduced stepwise at a quantity of 1 dB every 10 seconds, and if the amplifier output is still over 30 dB at the time when it has been reduced by 10 dB from the initial level, the power supply to the amplifier is then turned off.

SUMMARY OF THE INVENTION

In view of the above, an object of the present invention is intended to solve the above-mentioned conventional problems, and has for its object to provide a repeater amplifier apparatus of the character as described above in which an operator is able to change an operation program of a slave station device without actually visiting to an installation site of the slave station device, thus enabling the operation program to be changed in an efficient manner.

Bearing the above object in mind, according to the present invention, there is provided a repeater amplifier apparatus comprising a repeater amplifier apparatus comprising: a master station device for communicating with a base station device; a slave station device connected to the master station device and adapted to communicate with a mobile station device; and slave station operation program changing means for changing an operation program of the slave station device from the master station device when the master and slave station devices are in normal operation.

With such a construction of the repeater amplifier apparatus, an operator can change the operation program of the slave station device even if the operator does not actually go to the site of installation at which the operation program of the slave station device is stored.

In one preferred form of the invention, the rely amplifier apparatus further comprises means for enabling the operation program of the slave station device to be changed without interrupting the control operation of the slave station device while changing the slave station operation program.

Thus, it is possible to readily change the operation program of the slave station device from the master station device while allowing the control operations of the master station device and the slave station device to continue.

In another preferred form of the invention, the slave station device comprises a master CPU for changing the slave station operation program, and the means for enabling the operation program of the slave station device without interrupting the control operation of the slave station device while changing the slave station operation program comprises a slave CPU for controlling the operation of the slave station device during the master CPU is changing the slave station operation program.

In a further preferred form of the invention, the master station device comprises: a first down repeater for receiving a signal from the base station device to amplify and send it to the slave station device; a first up repeater for receiving a signal from the slave station device and amplify and send it to the base station device; and a first control unit for controlling the master station device.

In a still further preferred form of the invention, the slave station device comprises: a second down repeater for receiving a signal from the master station device to amplify and send it to the mobile station device; a second up repeater for receiving a signal from the mobile station device and amplify and send it to the master station device; and a control unit for controlling the slave station device. The slave station operation program changing means changes the operation program of the slave station device through the first control unit of the master station device when the master and slave station devices are in normal operation.

In a further preferred form of the invention, operation program data is transmitted from the master station device to the second control unit of the slave station device in such a manner as to be superimposed on an RF signal indicative of transmission information. Thus, it is possible to avoid the intrinsic function of the repeater amplifier apparatus being interrupted or impaired in the process of changing the operation program and/or transmitting the operation program data.

In a further preferred form of the invention, the operation program of the slave station device control unit after having been changed can be restored to the previous or original state. Accordingly, even in the event there arises an error or trouble in writing a new operation program into the slave station device, it is possible to reinstate the slave station device to its original state, thus enabling it to be re-activated or restarted.

In a yet further preferred form of the invention, the master station device further comprises: a first antenna for radio communication with the base station device; a shared unit connected to the first antenna and having an input connected to the first up repeater and an output connected to the first down repeater; and a power supply for supplying electric power to the first up and down repeaters, the first control unit and the first shared unit.

In a further preferred form of the invention, the down repeater comprises: a down amplifier having an input connected to an output of the first shared unit; an electro-optical transducer having an input connected to an output of the first down amplifier and an output side of the first control unit; and an optical distributor having an input connected to an output of the electro-optical transducer and an output connected to the slave station device through an optical cable.

In a further preferred form of the invention, the up repeater comprises: an opto-electrical transducer connected to an output side of the slave station device; a synthesizer having an input connected to an output side of the opto-electrical transducer and an output connected to the first control unit; and an up amplifier having an input connected to the output of the synthesizer and an output connected to the input of the shared unit.

In a further preferred form of the invention, the slave station device further comprises: a second shared unit connected to an output side of the second down repeater; a second antenna provided on the shared unit for radio communication with the mobile station device; and a second power supply for supplying electric power to the second up and down repeaters, the second control unit and the second shared unit.

In a further preferred form of the invention, the second down repeater comprises: an opto-electrical transducer having an input connected to an output side of the master station device through an optical cable and an output connected to the second control unit; and a down amplifier having an input to an output of the opto-electrical transducer and an output connected to the second shared unit.

In a further preferred form of the invention, the second up repeater comprises: an up amplifier having an input connected to an output side of the shared unit and an output connected to the second control unit; and an electro-optical transducer having an input connected to the output of the up amplifier and an output connected to an input side of the master station device through an optical cable.

In a further preferred form of the invention, the first control unit of the master station device comprises: a first CPU; a ROM connected to the first CPU for storing a program for controlling the master station device; a RAM connected with the first CPU for temporarily storing data; an external interface connected to the first MPU and adapted to be connected with a computer for changing or rewriting the slave station operation program with a new operation program stored therein; and a first modem connected to the first CPU for communication with the slave station device and having an input connected to the first up repeater and an output connected to the first down repeater.

In a further preferred form of the invention, the second control unit of the slave station device comprises; a second CPU; a second readable and rewriteable ROM connected to the second CPU for storing the slave station operation program; a second RAM connected with the second CPU for temporarily storing data; and a second modem connected to the second CPU for communication with the first modem of the master station device and having an input connected to the second up repeater and an output connected to the second down repeater.

In a further preferred form of the invention, the ROM of the second control unit has an address configuration comprising: a vector area in which there are stored an initialization program for initializing the respective components of the slave station device and a rewrite-processing program for rewriting the slave station operation program; a first application area for storing the slave station operation program; and a second application area usable for temporarily storing the slave station operation program, which is moved thereto from the first application area prior to rewriting a new operation program thereinto.

The above and other objects, features and advantages of the present invention will become more readily apparent from the following detailed description of a preferred embodiment of the invention taken in conjunction with the accompanying drawings.

DESCRIPTION OF THE PREFERRED EMBODIMENTS

Now, preferred embodiments of the present invention will be described in detail while referring to the accompanying drawings.

Figure 1:
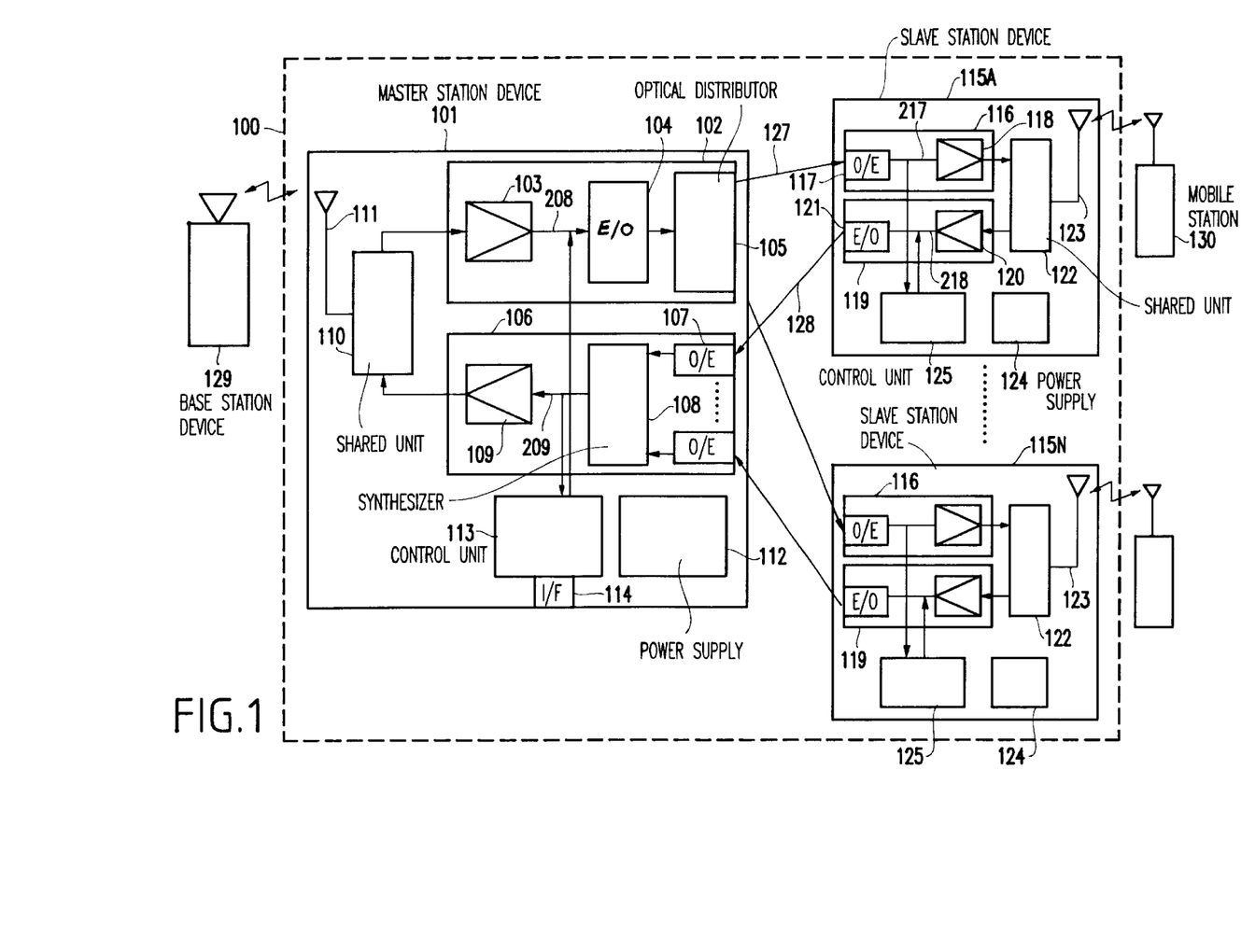
FIG. 1 is a block diagram showing a repeater amplifier apparatus in the form of a booster for a portable telephone in an embodiment of the present invention.

FIG. 1 illustrates in block form a repeater amplifier apparatus or booster for a portable telephone constructed in accordance with the principles of the present invention.

As shown in FIG. 1, the portable telephone repeater amplifier apparatus, generally designated at a reference numeral 100, is equipped with a master station device 101 for communicating with a base station device 129, and a plurality of slave station devices 115A–115N for performing radio communication (transmission and reception) with slave station devices such as portable telephones.

The master station device 101 includes an antenna 111 (first antenna) for radio communication with the base station device 129, a common or shared unit 110 (first shared unit) connected to the antenna 111, a down repeater 102 (first down repeater) connected to an output side of the shared unit 110, an up repeater 106 (first up repeater) connected to an input side of the shared unit 110, a first control unit 113 (first control unit) to be described in detail later, a power supply 112 (first power supply) for supplying electric power to the respective components, and an external interface 114 provided at the control unit 113.

Here, the down repeater 102 includes a down amplifier 103 connected to the output side of the shared unit 110, an electro-optical transducer 104 connected to an output side of the down amplifier 103, and an optical distributor 105 connected to an output side of the electro-optical transducer 104.

In addition, the up repeater 106 includes a plurality of opto-electrical transducers 107 connected to corresponding electro-optical transducers 121 of the slave station devices 115A–115N, respectively, a synthesizer 108 connected to the opto-electrical transducers 107, and an up amplifier 109 connected to an output side of the synthesizer 108. An output side of the up amplifier 109 is connected to the input side of the shared unit 110.

The slave station devices 115A–115N are each equipped with a down repeater 116 (second down repeater), a common or shared unit 122 (second shared unit) connected to an output side of the down repeater 116, an up amplifier 120 (second up amplifier) connected to an output side of the shared unit 122, an antenna 123 (second antenna) provided on the shared unit 122 for radio communication with a mobile station device 130, a power supply 124 for supplying electric power to the respective components, and a control unit 123 (second control unit) to be described in detail later.

The down repeater 116 includes an opto-electrical transducer 117 connected at its input side to an output side of the optical distributor 105 of the master station device 101 through a down optical cable 127, and a down amplifier 118 connected at its input to an output side of the opto-electrical transducer 117 and at its output side to the shared unit 122.

The up repeater 119 includes an up amplifier 120 connected at its input side to the shared unit 122, and an electro-optical transducer 121 connected at its input side to the up amplifier 120 and at its output side to the input side of the corresponding opto-electrical transducer 107 of the master station device 101 through an up optical cable 128.

Next, the general operation of the repeater amplifier apparatus shown in FIG. 1 will be explained below.

The portable telephone repeater amplifier apparatus 100 is to relay or repeat a radio frequency (RF) signal between a plurality of mobile station devices disposed at certain locations, e.g., in the interior of a tunnel, where electric or radio waves do not reach, and a base station device set up in the outdoor, so as to enable the mobile station devices to be used for communication. For this reason, the repeater amplifier apparatus 100 has high publicity so that once the apparatus 100 is turned on to start its operation, it is required to maintain its operating condition as long as possible.

The master station device 101 amplifies a down RF signal received from the base station device 129 and transmits it to the slave station devices 115A–115N, and also it amplifies an up RF signal received from each of the slave station devices 115A–115N and transmits it to the base station device 129.

The down repeater 102 superimposes a modem signal from the control unit 113 on the radio frequency signal which has been amplified to a desired level by means of the down amplifier 103. The resultant signal is then converted into an optical signal by means of the electro-optical transducer 104, and distributed and sent by the optical distributor 105 to the plural slave station devices 115A–115N through the down optical cables 127.

The up repeater 106 operates such that the optical signals received from the plural slave station devices 115A–115N via the up optical cables 128 are converted by the opto-electrical transducer 107 into corresponding electrical signals, which are then synthesized into a single signal by means of the synthesizer 108. The synthesized signal is divided into a modem signal and an RF signal, the modem signal being transmitted to the control unit 113, whilst the RF signal being transmitted to the up amplifier 109.

The shared unit 110 transmits the down RF signal received at the antenna 111 from the base station device 129 to the down amplifier 103. Also, the shared unit 110 transmits the up RF signal from the up amplifier 109 to the base station device 129 through the antenna 111.

The power supply unit 112 serves to supply electric power to the respective components of the master station device 101.

The control unit 113 controls the master station device 101 and communicates with the slave station devices 115A–115N so as to supervise and control them. Details of the way how to modify or change the slave station operation program will be described later.

The interface 114 is an external interface which is used for maintaining the portable telephone repeater amplifier apparatus 100.

The slave station devices 115A–115N are each set up in such a place as, for example, a tunnel, a building, an underground shopping center, etc., where the radio signal transmitted directly from the base station device 129 does not reach, so that it amplifies a down RF signal received from the master station device 101 to transmit it to a mobile station device 130, and also amplifies an up RF signal received from a slave station device 130 to transmit it to the master station device 101.

The down repeater 116 operates such that an optical signal received from the master station device 101 through the down optical cable 127 is converted by the opto-electrical transducer 117 into a corresponding electrical signal, which is then divided into a modem signal and an RF signal. The modem signal is transmitted to the control unit 125, and the RF signal is transmitted to the down amplifier 118.

The up repeater 119 superimposes the modem signal from the control unit 125 on the RF signal which has been amplified to a desired level by means of the up amplifier 120. The amplified signal is then converted by the electro-optical transducer 121 into a corresponding optical signal and transmitted to the master station device 101 through the up optical cable 128.

The shared unit 122 transmits the down RF signal from the down amplifier 118 to the corresponding mobile station device 130 through the antenna 123. Also, the shared unit 122 transmits the up RF signal received at the antenna 123 from the corresponding mobile station device 130 to the up amplifier 120.

The power supply unit 124 serves to supply electric power to the respective components of the related slave station device.

The control unit 125 controls the related slave station device, and communicates with the master station device 101 so as to inform it of the operating state of the related slave station device. Details of the way how to change or modify a slave station operation program stored in each slave station control unit 125 will be described later.

Here, the slave station devices 115A–115N connected to the master station device 101 shows that two or more slave station devices can be connected to the master station device.

The down optical cables 127 are to transmit the optical signals distributed by the optical distributor 105 of the master station device 101 to the respective opto-electrical transducers 117 of the plural slave station devices 115A–115N.

The up optical cables 128 are to transmit the optical signals output from the respective electro-optical transducers 121 of the plural slave station devices 115A–115N to the opto-electrical transducer 107 of the master station device 101. The base station device 129 comprises a radio communication base station device for portable telephones which is to be installed by a business person or enterprise for transmitting a down RF signal to as well as receiving an up RF signal from the master station device 101 of the portable telephone repeater amplifier apparatus 100.

The slave station device 130 comprises a portable telephone which is used by a general user for transmitting a down RF signal to and receiving an up RF signal from the master station device of the portable telephone repeater amplifier apparatus 100.

Now, a more concrete or specific operation of this embodiment will be explained below.

Figure 2:
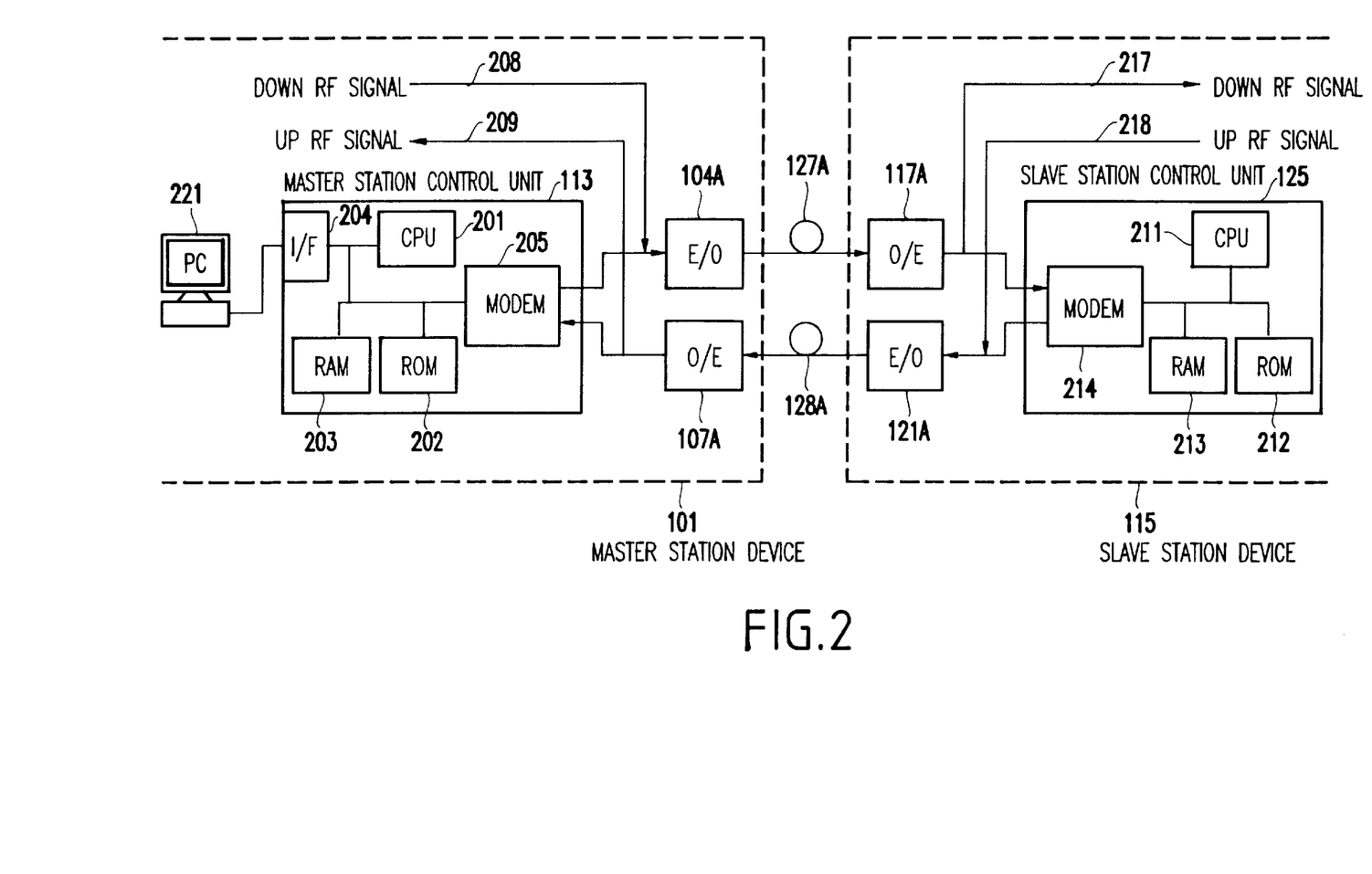
FIG. 2 is a block diagram showing the details of control units and their related components according to the embodiment of the present invention.

FIG. 2 shows the details of the control units 114,125 of the portable telephone repeater amplifier apparatus according to this embodiment. Although a plurality of slave station devices can actually be connected to the master station device 101, only one of them is exemplarily shown and designated at a reference numeral 115 in FIG. 2 for the sake of simplicity in the description with the optical distributor 105 and the synthesizer 108 in FIG. 1 being omitted.

As shown in FIG. 2, the master station control unit 113 comprises a central processing unit (hereinafter referred simply to as a CPU) 201 and its associated elements including a ROM 202, a RAM 203, an external interface 204 and a modem 205 all connected to the CPU 201.

An electro-optical transducer 104A corresponding to the element 104 of FIG. 1 is connected to an output side of the modem 205 which is connected at its input side to an opto-electrical transducer 107A. Moreover, the transmission line 208 for a down RF signal output to the electro-optical transducer 104A is connected to an output side of the modem 205, an input side of which is connected the transmission line 209 for an up RF signal output from the synthesizer (not shown in FIG. 2 but see the element 108 in FIG. 1) to the up amplifier (not shown in FIG. 2 but see the element 109 in FIG. 1). A personal computer (PC) 221 is connected to the external interface 204.

In FIG. 2, the slave station control unit 125 comprises a CPU 211 and its associated elements including a ROM 212, a RAM 213 and a modem 214 all connected to the CPU 211.

An electro-optical transducer 121A corresponding to the element 121 in FIG. 1 is connected to an output side of the modem 214, an input side of which is connected an opto-electrical transducer 117A. Moreover, the up transmission line 218 for an up RF signal output to the electro-optical transducer 121 in FIG. 1 is connected to the output side of the modem 214, and the down transmission line 217 for a down RF signal output from the opto-electrical transducer 117A to the down amplifier 116 in FIG. 1 is connected to the input side of the modem 205.

Here, note that elements 127A and 128A correspond to the down optical cable 127 and the up optical cable 128 of FIG. 1, respectively.

With the above-mentioned construction of the repeater amplifier apparatus, the master station control unit 113 normally controls the master station device 101 and communicates with the slave station devices to supervise and control them.

The CPU 201 performs input and output control on the interface 204, the processing of data input from the interface 204, input and output control on the modem 205, communication with the slave station devices through the modem 205, reading of the system operation program stored in the ROM 202, and writing of the processed data into the RAM 203.

The ROM 202 stores the operation program for the CPU 201, and to this end, it comprises a readable and writeable memory such as a flash memory which data can be read out of and written into. However, the ROM 202 is usually used as a read-only memory.

The RAM 203 temporarily preserves a variety of data including the data input from the interface 204, the data to be transmitted and received through the modem 205, and the data being processed by the CPU 201.

The interface 204 is a serial interface of the RS-232C type, and serves as an external interface to which a special-purpose or exclusive processing device or tool can be connected when maintenance of the portable telephone repeater amplifier apparatus 100 is carried out. In addition, the interface 204, being an RS-232C type serial interface, can be connected to a personal computer or the like for data transmission therebetween.

The modem 205 is of the frequency modulation type and performs data transmission and reception at two different frequencies representing "0" and "1", respectively. Thus, this modem signal can be transmitted through the RF transmission path while being superimposed on other signals therein, for communication with the slave station devices.

The electro-optical transducer 104A converts a down RF signal 208 in the form of an electric signal and the output signal of the modem 205 superimposed thereon into corresponding optical signals.

The opto-electrical transducer 107A converts an up RF signal in the form of an optical signal transmitted from the slave station device 115 and the modem signal of the slave station superimposed thereon into corresponding electric signals.

The down RF signal 208 comprises an RF signal amplified by the down amplifier 103, and the up RF signal 209 comprises an RF signal input to the up amplifier 109.

The slave station control unit 125 usually controls the slave station device 115 and communicates with the master station device 101. The CPU 211 controls the input and output of the modem 214, communicates with the master station device 101 through the modem 214, reads out the system operation program stored in the ROM 212, and writes the processed data into the RAM 213.

The ROM 212 stores the operation program for the CPU 211, and to this end, it comprises a readable and writeable memory such as a flash memory which data can be read out of and written into. The ROM 212 is usually used as a read-only memory. The RAM 213 temporarily preserves a variety of data including the data to be transmitted and received through the modem 214, and the data being processed by the CPU 211.

The modem 214 is of the same frequency modulation type as the one used with the master station device, and performs data transmission and reception at two different frequencies representing "0" and "1", respectively. Thus, this modem signal can be transmitted through an RF transmission path while being superimposed on other signals therein, for communication with the master station device.

The opto-electrical transducer 117A converts a down RF signal in the form of an optical signal transmitted from the master station device and the modem signal of the master station device superimposed on the down RF signal into corresponding electric signals.

The electro-optical transducer 121A converts an up RF signal 218 in the form of an electric signal and the output signal of the modem 214 superimposed thereon into corresponding optical signals.

The down RF signal 217 comprises an RF signal input to the down amplifier 118, and the up RF signal 218 comprises an up RF signal amplified by the up amplifier 120. The personal computer (PC) 221 can be connected to the interface 204 of the master station control unit 113, and stores therein slave station operation program data which is used for changing another operation program stored in the slave station device as required according to the embodiment of the present invention.

Next, reference is made to the procedure or data flow for changing the operation program stored in the slave station 115 in accordance with the embodiment of the present invention.

First, the PC 221 is connected to the interface 204 of the master station control unit 113 so that the CPU 201 comes to be able to transmit and receive data to and from the PC 221. Thus, the CPU 201 temporarily stores in the RAM 203 a slave station operation program data transmitted from the PC 221.

The slave station operation program data in the form of binary data comprising "1" and "0" thus stored in the RAM 203 is converted into two kinds of frequency signals by means of the modem 205, which are then superimposed on the down RF signal and transmitted as electric signals to the electro-optical transducer 104A. The slave station operation program data thus received as electric signals are converted into corresponding optical signals by means of the electro-optical transducer 104A.

The converted optical signals are further transmitted to the opto-electrical transducer 117A of the slave station device 115 through the down optical cable 127A. The opto-electrical transducer 117A converts the received optical signals into corresponding electric signals. The converted electric signals are passed through a filter and divided into an RF signal and slave station operation program data that has already been converted into two kinds of frequency signals by means of the opto-electrical transducer 117A.

The slave station operation program data thus converted into the two kinds of divided frequency signals is returned to the original digital signal in the form of binary data comprising "1" and "0" by means of the modem 214. The CPU 211 of the slave station control unit 125 then temporarily stores in the RAM 213 the slave station operation program data received by the modem 214, and carries out processing by which the content of the ROM 212 is rewritten or changed.

Now, the processing for changing the slave station operation program in the ROM 212 will be explained while referring to FIG. 3 and FIG. 4.

Figure 3:
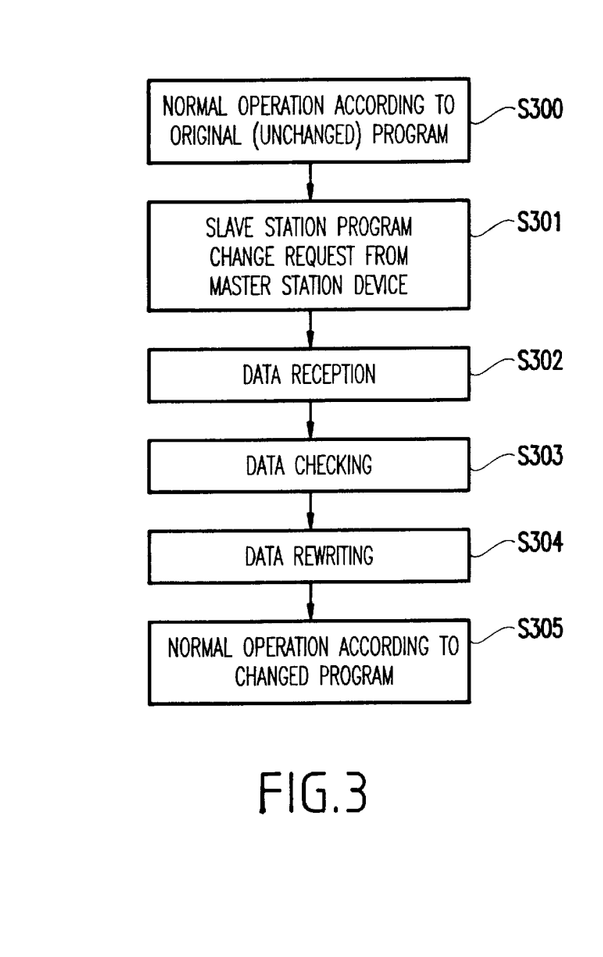
FIG. 3 is a flow chart showing the procedure for changing software program data for a slave station device according to the embodiment of the present invention.

FIG. 3 is a flow chart illustrating the flow of changing the software program data in the slave station device 115.

As shown in FIG. 3, in step S300, the slave station device 115 performs the normal operation in accordance with an original or unchanged program (i.e., program before change) stored therein, and hence plays the role as a slave station device of the portable telephone repeater amplifier apparatus. When the slave station device receives a slave station program change request from the master station device in step S301, it shifts its operation to a data reception operation mode in step S302. In this regard, note that an operator (e.g., maintenance person) operates the PC by inputting an instruction or command, the master station device connected to the PC outputs the slave station program change request to the slave station device.

An example of the slave station program change as referred to herein is that at customer's request, one specification or operation mode of the system in which the power supply to the amplifier is turned off when the output of the amplifier exceeds a predetermined level (e.g., 30 dB) due to an excessive input thereto is changed to another specification or operation mode in which when the output of the amplifier exceeds a predetermined level (e.g., 30 dB), the amplifier output is first reduced stepwise at a prescribed quantity (e.g., 1 dB) at predetermined time intervals (e.g., 10 seconds), and if the amplifier output is still over the predetermined level at the time when it has been reduced by a certain extent (e.g., 10 dB) from the initial level, the power supply to the amplifier is then turned off.

Here, it is to be noted that the received data is just one with the RF signal received from the base station device being superimposed thereon during its transmission to the slave station device, and hence the CPU, even if notified, during data transmission, of an alarm such as failure from a unit(s) or component(s) of the slave station device, can transmit such error information to the master station device through interruption processing. For this reason, it is possible to avoid impairing the intrinsic function of the portable telephone repeater amplifier apparatus.

The received data is stored in the RAM 213, and a data check is done in step S303. There are a variety of ways of data checking; one example is that each time the slave station device receives one bite of data, it may send the same data to the master station device, or alternatively, the slave station device may send the sum of the whole transmitted data to the master station device upon receipt thereof. When checking of all the received data is completed, the data is written in the ROM 212 in step S304. After the data writing ends, the slave station device resumes the normal operation in accordance with the freshly changed program in step S305.

Figure 4:
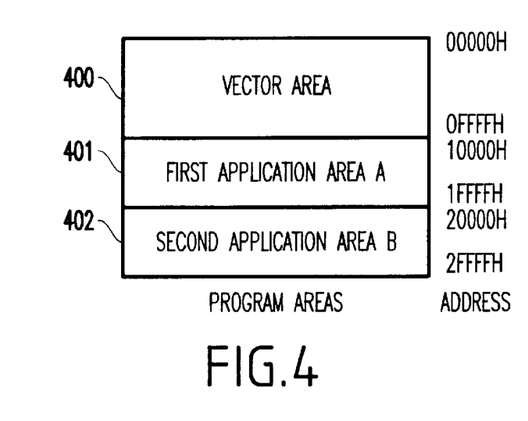
FIG. 4 shows a data configuration in a ROM of the slave station device according to the present invention.

FIG. 4 shows an exemplary configuration of data stored in the ROM of the slave station device according to the embodiment of the present invention.

An internal configuration of the ROM 212 in the form of a flash memory is as follows: address 0000'H–0FFF'H is a vector area 400; address 1000'H–1FFF'H is a first application area A401; and address 2000'H–2FFF'H is a second application area B402.

In the vector area 400 there are stored an initialization program for setting ports of the CPU 211 and initializing the respective portions or components of the slave station device as well as a change- or rewrite-processing program for changing the slave station operation program in accordance with the present invention.

In the first application area A401 there is stored the slave station operation program which is usually executed by the CPU 211 when processing of the program in the vector area 400 has been finished. The second application area B402 is a free or empty area of the same capacity as the first application area A401.

In order to change the operation program of the slave station device, the content of the first application area A401 is deleted or erased and the slave station operation program data stored in the RAM 213 is then written into the first application area A401. In this connection, note that the change-processing program is executed in the vector area 400 and hence does not stop during its execution even when the first application area A401 is rewritten.

In addition, if the original operation program (i.e., the program prior to the change) of the slave station device stored in the first application area A401 has been moved to the second application area B402 before the original program is erased, it is possible to restore the original program again after the operation program of the slave station device is changed.

With the configuration as described above, even in the event that there arises failure in the process of writing a new slave station operation program into the ROM 212, it is possible to re-activate the slave station device by executing the original operation program stored in the second application area B402. In this case, it goes without saying that the change-processing program stored in the vector area 400 for changing the slave station operation program is programmed in such a manner that a program stored in the second application area B402 is executed when a new slave station operation program can not be read out because of failure in the writing of the new operation program into the first application area A401.

As described above, according to this embodiment of the invention, provision is made for a slave station operation program changing means which serves to change the operation program for the control unit of a slave station device. Specifically, in the above-described embodiment, the operation program for the master station control unit 113 and the slave station control unit 125 as well as the transmission path from the PC 221 to the slave station control unit 125 have been explained as constituting the slave station operation program changing means, but for the purposes of the invention, it will be satisfactory for the operation program of the slave station device 115 to be changed in accordance with an instruction or command from the master station device 101. Therefore, it should be construed that the present invention is not limited to the above embodiment but instead various modifications and/or changes thereof can be made without departing from the spirit and scope of the invention as defined in the appended claims.

In the above-mentioned first embodiment, it is possible to readily change the contents of the ROM 212 storing the operation program of the slave station device 115 from the master station device 101 without interrupting the operation of the master station device 101, but during changing the slave station operation program, the control operation of the slave station device 115 is stopped.

In view of this, a second embodiment of the present invention enables the operation program of the slave station device 115 to be changed without stopping the control operation of the slave station device 115.

Figure 5:
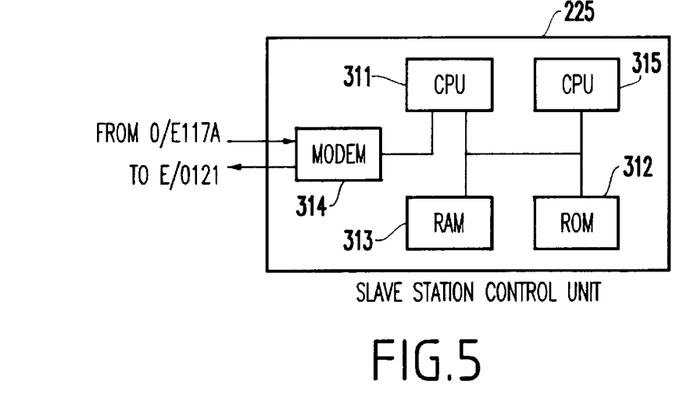
FIG. 5 is a block diagram showing the details of a slave station control unit in accordance with a second embodiment of the present invention.

FIG. 5 shows the construction of a slave station control unit 225 of a repeater amplifier apparatus in accordance with the second embodiment of the present invention. The construction of the repeater amplifier apparatus of the second embodiment is substantially similar to that of the aforementioned first embodiment except for the slave station control unit 225.

In FIG. 5, the slave station control unit 225 corresponding to that 125 of the first embodiment comprises a modem 314 connected to an opto-etectronic transducer 117A and an electro-optical transducer 121 (see FIG. 2), a master central processing unit (CPU) 311 connected to the modem 314, a slave central processing unit (CPU) 315 connected to the master CPU 311, and a read only memory (ROM) 312 and a random access memory (RAM) 313 both connected to the master CPU 311 and the slave CPU 315.

The slave station control unit 225 normally controls the slave station device 115 and performs communications with the master station device 101. The master CPU 311 performs input and output control of the modem 314, communications with the master station device 101 via the modem 314, and control of the slave CPU 315, and reads out a system operation program stored in the ROM 312 and writes data into the RAM 313. The slave CPU 315 reads out the system operation program stored in the ROM 312 and writes processed data into the RAM 313.

The ROM 312 takes the form of a writable and readable flash memory, stores therein operation programs of the master station device 101 and the slave station CPU 315, and usually used as a read only memory. The RAM 313 temporally stores therein data to be sent and received through the modem 314, as well as data being processed by the master CPU 311 and the slave CPU 315.

The slave station program data converted into two kinds of divided frequency signals is restored into digital signals in the form of "1" or "0". The master CPU 311 of the slave station control unit 225 temporally stores the slave station program data received through the modem 314 into the RAM 313, and rewrites the contents of the ROM 312. At this time, the slave CPU 315 continues to carry out its intrinsic function of controlling the slave station device 115 in parallel with rewriting the ROM 312.

The construction of the ROM 312 is the same as that of the ROM 212 as illustrated in FIG. 4 of the aforementioned first embodiment. Thus, the following explanation will be made referring to FIG. 4. The ROM 312 has a vector area 400 in which are stored an initialization program for performing initial settings of ports of the master CPU 311 and the slave CPU 315 as well as various portions of the slave station device 115, and an operation program of the master CPU 311.

The ROM 312 also has an application area A 401 storing therein a slave station operation program, i.e., an operation program of the slave CPU 315, which is normally executed by the master CPU 311 after processing of the programs stored in the vector area 400. The application area B 402 is an empty area having the same capacity of that of an application area A 401.

In order to change the operation program of the slave station device 115, it is sufficient to write new slave station operation program data stored in the RAM 313 into the application area B 402 while leaving the contents of the application area A 401 as they stand. Since the rewriting of the program is carried out by the master CPU 311 in the vector area 400, it is possible to perform the change of the program while allowing the slave CPU 315 to continue to carry out its normal operation. Then, program changing can be made simply by switching the operation program from the application area A 401 into the application area B 402, and this can be effected by the master CPU 311 instructing the slave CPU 315 as to which application area is to be selected, i.e., instructing it to select the application area into which the new operation program has been written or moved. For the purpose of identifying the programs in the application area A 401 and the application area B 402 as "new" or "old", a bit in the form of "0" or "1" is provided in each of the application areas 401, 402. Usually, the slave CPU 315 operates in the one of the application areas which contains the new program, but if otherwise instructed by the master CPU 311, it is also possible to make the slave CPU 315 operate even in the other application area which contains the old program, Thus, according the second embodiment, provision is made for a means for enabling, upon changing an operation program of the slave station device 115, the operation program to be changed without interrupting the control operation of the slave station device 115. With this provision, it becomes possible to change the operation program of the slave station device 115 while allowing the control operation of the slave station device 115 to be continuously carried out without any interruption.

As apparent from the foregoing description, the present invention provides the following remarkable advantages. By the provision of the slave station operation program changing means for changing the operation program of the control unit of each slave station device, an operator can readily change or rewrite, from the master station device, the content of the ROM storing the operation program of the slave station device without stopping the operations of the master and slave station devices.

Moreover, the rely amplifier apparatus further includes means for enabling the operation program of the slave station device to be changed without interrupting the control operation of the slave station device while changing the slave station operation program. Thus, it is possible to readily change the contents of a ROM, which stores the operation program of the slave station device, from the master station device while allowing the control operations of the master station device and the slave station device to continue.

In addition, operation program data is transmitted from the master station device to the second control unit of the slave station device in such a manner as to be superimposed on an RF signal indicative of transmission information. Thus, it is possible to avoid the intrinsic function of the repeater amplifier apparatus being interrupted or impaired in the process of changing the operation program and/or transmitting the operation program data.

Further, since the operation program of the slave station device control unit after having been changed can be restored to the previous or original state, even in the event there arises an error or trouble in writing a new operation program into the slave station device, it is possible to reinstate the slave station device to its original state, thus enabling it to be re-activated or restarted.

While the invention has been described in terms of a few preferred embodiments, those skilled in the art will recognize that the invention can be practiced with modification within the spirit and scope of the appended claims.

What is claimed is:

1. A repeater amplifier apparatus comprising:
    a master station device for communicating with a base station device;
    a slave station device connected to said master station device and adapted to communicate with a mobile station device in accordance with a first operation program; and
    slave station operation program changing means for changing from said first operation program for said slave station device to a second operation program for said slave station device received from said master station device while said slave station device operates based upon said first operation program,
    wherein said master station device comprises:
        a down repeater for receiving a signal from said base station device to amplify and send said signal to said slave station device;
        an up repeater for receiving a signal from said slave station device and amplifying and sending said signal to said base station device; and
        a control unit for controlling said master station device.

2. The repeater amplifier apparatus according to claim 1, wherein said master station device further comprises:
    an antenna for radio communication with said base station device;
    a shared unit connected to said antenna and having an input connected to said up repeater and an output connected to said down repeater; and
    a power supply for supplying electric power to said up and down repeaters, said control unit and said shared unit.

3. The repeater amplifier apparatus according to claim 2, wherein said down repeater comprises:
    a down amplifier having an input connected to an output of said shared unit;
    an electro-optical transducer having an input connected to an output of said down amplifier and an output side of said control unit; and
    an optical distributor having an input connected to an output of said electro-optical transducer and an output connected to said slave station device through an optical cable.

4. The repeater amplifier apparatus according to claim 2, wherein said first up repeater comprises:
    an opto-electrica transducer connected to an output side of said slave station device;
    a synthesizer having an input connected to an output side of said opto-electrical transducer and an output connected to said control unit; and
    an up amplifier having an input connected to the output of said synthesizer and an output connected to the input of said shared unit.

5. The repeater amplifier apparatus according to claim 1, wherein said control unit of said master station device comprises:
    a CPU;
    a ROM connected to said CPU for storing a program for controlling said master station device;
    a RAM connected with said CPU for temporarily storing data;
    an external interface connected to said CPU and adapted to be connected with a computer for changing or rewriting said first operation program with said second operation program stored therein; and
    a modem connected to said CPU for communication with said slave station device and having an input connected to said up repeater and an output connected to said down repeater.

6. A repeater amplifier apparatus comprising:
    a master station device for communicating with a base station device;
    a slave station device connected to said master station device and adapted to communicate with a mobile station device in accordance with a first operation program; and
    slave station operation program changing means for changing from said first operation program for said slave station device to a second operation program for said slave station device received from said master station device while said slave station device operates based upon said first operation program,
    wherein said slave station device comprises:
        a down repeater for receiving a signal from said master station device to amplify and send it to said mobile station device;
        an up repeater for receiving a signal from said mobile station device and amplifying and sending said signal to said master station device; and
        a control unit for controlling said slave station device,
    wherein said slave station operation program changing means changes the operation program of said slave station device through a control unit unit of said master station device when said master and slave station devices are in normal operation.

7. The repeater amplifier apparatus according to claim 6, wherein said slave station device further comprises:
- a shared unit connected to an output side of said down repeater;
- an antenna provided on said shared unit for radio communication with said mobile station device; and
- a power supply for supplying electric power to said up and down repeaters, said control unit and said shared unit.

8. The repeater amplifier apparatus according to claim 6, wherein said down repeater comprises:
- an opto-electrical transducer having an input connected to an output side of said master station device through an optical cable and an output connected to said control unit; and
- a down amplifier having an input to an output of said opto-electrical transducer and an output connected to a shared unit.

9. The repeater amplifier apparatus according to claim 6, wherein said up repeater comprises:
- an up amplifier having an input connected to an output side of a shared unit and an output connected to said control unit; and
- an electro-optical transducer having an input connected to the output of said up amplifier and an output connected to an input side of said master station device through an optical cable.

10. The repeater amplifier apparatus according to claim 6, wherein said control unit of said slave station device comprises:
- a CPU;
- a readable and rewriteable ROM connected to said CPU for storing said slave station operation program;
- a RAM connected with said CPU for temporarily storing data; and
- a modem connected to said CPU for communication with said master station device and having an input connected to said up repeater and an output connected to said down repeater.

11. The repeater amplifier apparatus according to claim 10, wherein said ROM of said control unit has an address configuration comprising:
- a vector area in which there are stored an initialization program for initializing the respective components of said slave station device and a rewrite-processing program for rewriting said slave station operation program;
- a first application area for storing said slave station operation program; and
- a second application area usable for temporarily storing said slave station operation program which is moved thereto from the first application area prior to rewriting a new operation program thereinto.

12. A repeater amplifier apparatus comprising:
- a master station device for communicating with a base station device;
- a slave station device connected to said master station device and adapted to communicate with a mobile station device in accordance with a first operation program; and
- slave station operation program changing means for changing from said first operation program for said slave station device to a second operation program for said slave station device received from said master station device while said slave station device operates based upon said first operation program,
- wherein operation program data is transmitted from said master station device to a control unit of said slave station device in such a manner as to be superimposed on an RF signal indicative of transmission information.

13. A repeater amplifier apparatus comprising:
- a master station device for communicating with a base station device;
- a slave station device connected to said master station device and adapted to communicate with a mobile station device in accordance with a first operation program; and
- slave station operation program changing means for changing from said first operation program for said slave station device to a second operation program for said slave station device received from said master station device while said slave station device operates based upon said first operation program,
- wherein the operation program of said slave station device, after having been changed, is restorable to the previous state without retransmitting the first operation program.

* * * * *